United States Patent [19]
Ogami et al.

[11] Patent Number: 4,919,087
[45] Date of Patent: Apr. 24, 1990

[54] INTAKE SYSTEM FOR V-TYPE VEHICLE ENGINE

[75] Inventors: Muneyuki Ogami; Yasuhiro Kawasako; Takenori Otsuka; Tetsuo Hiraoka; Koichi Hatamura, all of Hiroshima, Japan

[73] Assignee: Mazda Motor Corporation, Hiroshima, Japan

[21] Appl. No.: 241,727

[22] Filed: Sep. 8, 1988

[30] Foreign Application Priority Data

Sep. 8, 1987 [JP] Japan .............................. 62-222976
Sep. 8, 1987 [JP] Japan .............................. 62-222977

[51] Int. Cl.⁵ ............................................. F02B 75/22
[52] U.S. Cl. ................................................. 123/52 MV
[58] Field of Search .......... 123/52 M, 52 MV, 52 MB

[56] References Cited

U.S. PATENT DOCUMENTS

| | | | |
|---|---|---|---|
| 2,771,863 | 11/1956 | Porsche et al. | 123/52 MV |
| 4,513,699 | 4/1985 | Cser | 123/52 MB |
| 4,649,871 | 3/1987 | Hatamura et al. | 123/52 MV |
| 4,700,666 | 10/1987 | Ura et al. | 123/52 MV |
| 4,708,097 | 11/1987 | Hatamura et al. | 123/52 MV |
| 4,715,329 | 12/1987 | Yasuda et al. | 123/52 MV |
| 4,741,294 | 5/1988 | Yasuda et al. | 123/52 MV |

Primary Examiner—Noah P. Kamen
Attorney, Agent, or Firm—Fleit, Jacobson, Cohn, Price, Holman & Stern

[57] ABSTRACT

An intake system includes two surge tanks for cylinders in first and second cylinder banks of a V-type internal combustion engine which are arranged side by side over one of the first and second cylinder banks in the lengthwise direction of its associated engine and, are preferably formed as one unit and includes intake passages arranged in series in the lengthwise direction, each intake pipe connecting the surge tank with each of the cylinders in the first and second cylinder banks. The outermost intake passages disposed at the opposite ends of the surge tanks extend outward of the surge tanks in the opposite directions and are bent back into a space between the first and second cylinder banks. The remaining intake passages for the cylinders in the first cylinder bank are of C-shaped passage and the remaining intake passages for the cylinders in the second cylinder bank cross inside the C-shaped intake pipes in the space.

15 Claims, 2 Drawing Sheets

INTAKE SYSTEM FOR V-TYPE VEHICLE ENGINE

FIELD OF THE INVENTION

The present invention relates to an intake system for a V-type vehicle engine, and more particularly to an intake system for a V-type vehicle engine which is so designed as to utilize advantageously the dynamic characteristics of intake air.

BACKGROUND OF THE INVENTION

As is conventionally well known, intake systems are improved in the charging efficiency of intake air by making use of pressure waves caused to the dynamic characteristics of intake air such as intake inertia, resonance and so forth so as to obtain an increased generating power of a vehicle engine. Such intake systems are inevitably made bulky or oversized, not only because of the necessity of providing a surge tank as means for reversing negative pressure waves caused in the intake system and conducting the reversed pressure waves into a combustion chamber of such cylinder of the vehicle engine, but because of the necessity of a sufficient length of intake pipe in order to conduct timely the reversed pressure waves from said pressure reversing means into the combustion chamber of the cylinder.

In an attempt at overcoming the drawbacks associated with the above-described intake systems, an intake system for a V-type vehicle engine is disclosed in, for example, U.S. Pat. No. 4,649,871 entitled Intake System For V-Type Engine issued on Mar. 17, 1987 and assigned to the same asignee as the present invention. The intake system taught by the U.S. Pat. No. 4,649,871 has intake passages for engine cylinders in each cylinder bank which first extend from the side of a surge tank remote from the cylinder bank toward the other cylinder bank and then are bent toward the cylinder so that the intake passages for both the cylinder banks cross one another below the surge tank. Each intake passage for the cylinders in each cylinder bank comprises a U-shaped bight portion which projects from the side of the surge tank remote from the cylinder bank toward the other cylinder bank and is bent toward the cylinder bank, and a crossing portion which is connected between the corresponding intake port in the cylinder bank and the downstream end of the U-shaped bight portion and crosses the intake passages for the cylinders in the other cylinder bank below the surge tank.

A drawback associated with the above-described intake system is not only that, because the surge tanks are arranged side by side in the transverse direction of the vehicle engine, and it is difficult to make use of a large cross sectional area of surge tank, but that, because of the large curvature of the intake passages, intake air is subjected to an increased resistance, resulting in the difficulty of taking in a large quantity of air in a high speed operating range of engine. In order to allow the provision of a large cross sectional area of surge tank and a reduced curvature of intake passages, it is unavoidable to increase the overall height of the vehicle engine. However, because engines with intake systems are located below a hood, the intake systems are preferably designed to be as low and compact as possible to take the smallest headroom.

In the light of these somewhat conflicting design requirements that govern the efficiency and construction of intake systems, an improved intake system is disclosed in U.S. Pat. No. 4,708,097 entitled Induction System For V-Type Internal Combustion Engine issued on Nov. 24, 1987 and assigned to the same assignee as the present invention. The intake system taught by the U.S. Pat. No. 4,708,097 includes a surge tank arranged above one of first and second cylinder banks; first intake passages shaped in a C-configuration for feeding intake air from the surge tank to the cylinders in the first cylinder bank, each being connected with one side wall of the surge tank at one end and with one of the cylinders in the first cylinder bank at the other end and consisting of an upstream intake passage and a downstream passage; second intake passages shaped in an L-configuration for feeding intake air from the surge tank to the cylindners in the second cylinder bank, each being connected with the one side wall of the surge tank at one end and with one of the cylinders in the second cylinder bank and consisting of an upstream intake passage and a downstream intake passage. The first and second intake passages and are connected with the surge tank at different points in elevation. This intake system, although advantageous not only to reduce intake air resistance but to be constructed compact, still involves a problem to be solved because, in the case the intake system is subjected in particular to a stringent limitation of overall height, the surge tank has to be provided as a flattened surge tank which increases intake air resistance in a high speed operation range of engine.

SUMMARY OF THE INVENTION

In view of the foregoing observations and description, the primary object of the present invention is to provide an intake system for a V-type internal combustion engine which is compact and can reduce intake air resistance.

A particular feature of the present invention resides in the cooperation of intake air passages provided one individual to each cylinder of a V-type vehicle engine which are gently curved in a space between banks of the V-type vehicle engine so as to be equal in length to one another and snugly arranged between the banks.

In accordance with the present invention, the intake system includes two surge tanks formed as one unit for cylinders in first and second cylinder banks of a V-type internal combustion engine and are arranged side by side over one of the first and second cylinder banks in the lengthwise direction of the engine. The intake passages are arranged in parallel, each connecting the surge tank with one of the cylinders in the first and second cylinder banks. The outermost intake passages disposed at the opposite ends of the surge tanks extend outward of the surge tanks in opposite directions and are bent back into a space between the first and second cylinder banks. The remaining intake passages for the cylinders in the first bank are C-shaped passages and the remaining intake passages for the cylinders in the second cylinder bank cross inside the C-shaped intake pipes of the first bank in the spaces defined by the C-shapes.

In accordance with the intake system of a preferred embodiment of the present invention, due to the arrangement of the surge tanks in the lengthwise direction of the V-type engine, the intake tank can be formed to have a large, substantially square cross section; this leads not only to a decreased intake air resistance and an improved pressure reversing, but also to a structural compactness of the intake system.

BRIEF DESCRIPTION OF THE DRAWINGS

The above and other objects and features of the present invention will become apparent from the following detailed description taken in conjunction with the preferred embodiments thereof with reference to the accompanying drawings in which like parts are designated by like numerals throughout the views of the drawings and wherein.

DETAILED DESCRIPTION OF THE INVENTION

Figure 1:
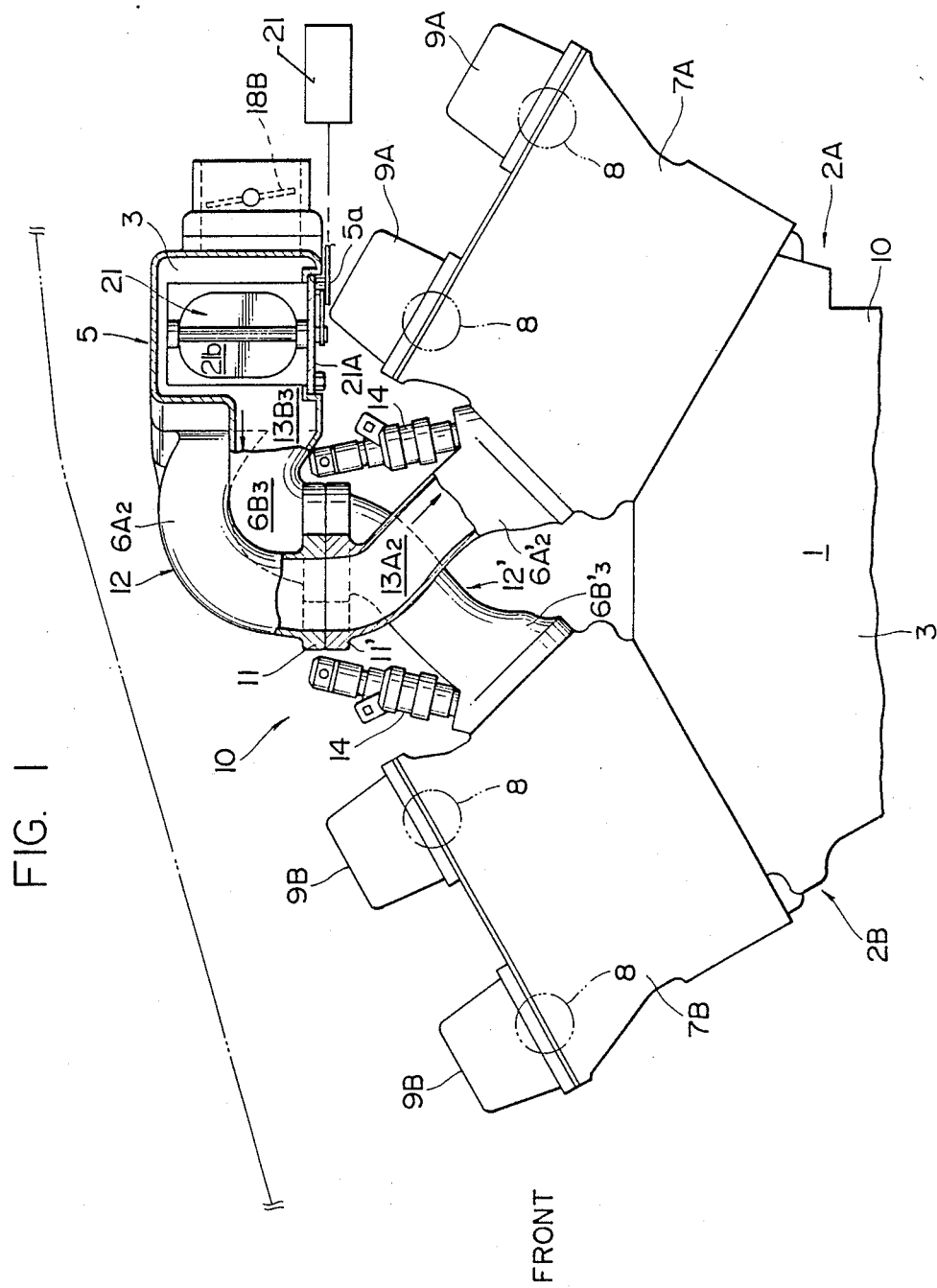
FIG. 1 is a side view of an intake system in cooperation with a V-type internal combustion engine installed crosswise in an engine room of a car, partly in cross section substantially along the line I—I of FIG. 2.
Figure 2:
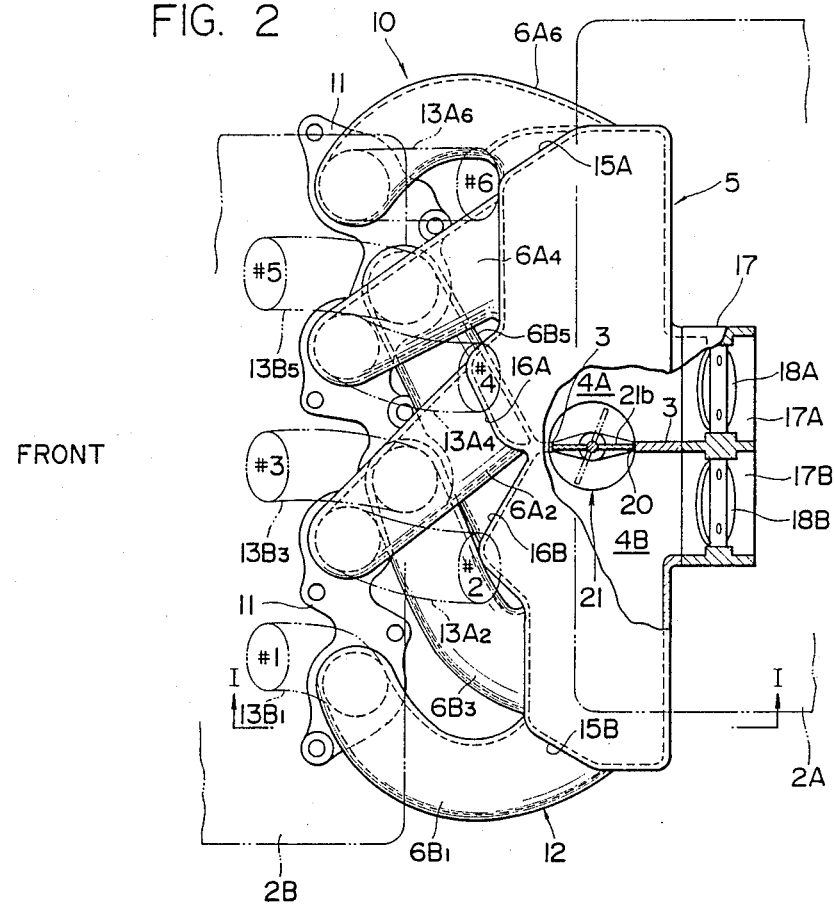
FIG. 2 is a top plan view, partly in cross section, of the intake system of FIG. 1.

Referring now to FIGS. 1 and 2, a V-type double overhead cam shaft engine 1 having an intake system 10 in accodance with a preferred embodiment of the present invention comprises a cylinder block 3 and first and second cylinder head 7A and 7B mounted on the cylinder block 3 at an angle to each other. The V-type vehicle engine 1 has six cylinders; second, fourth and sixth in a first cylinder bank 2A and first, third and fifth in a second cylinder bank 2B; and four over head cam shifts 8, two in each cylinder head 7A, 7B, covered by cylinder head covers 9A, and 9B, respectively. As is well known, the three cylinders of each cylinder bank 1A, 1B are discontinuous in firing timing so as to prevent intake valves of the three cylinders from opening simultaniously. As is shown by a double dotted line in FIG. 2, the first and second cylinder banks 2A and 2B are offset up and down as viewed in FIG. 2.

The V-type engine 1 is provided with an intake system 10 having a surge tank assembly 5 disposed over the cylinder head 7A on the side of the first cylinder bank 2A and configured in the form of a generally rectangular-box extending in the lengthwise direction of the engine 1 or in parallel with the overhead cam shafts 8 of the engine 1. The internal space of the surge tank assembly 5 is divided into two, first and second, surge tank compartments 4A and 4B isolated from each other by a partition wall 3 extending in the crosswise direction of the surge tank assembly 1 or perpendicular to the over head cam shafts 8 of the engine 1 and having a substantially square cross section.

The surge tank assembly 5 is connected with intake ports (not shown) of the first and second cylinder heads 7A and 7B by upper and lower intake manifolds 12 and 12' having first to sixth intake pipes. In more detail, the first surge tank compartment 4A of the surge tank assembly 5 is connected with three intake ports in the first cylinder head 7A by means of second, fourth and sixth upper intake pipes $6A_2$, $6A_4$ and $6A_6$ of the upper intake manifold 12 arranged in this order from the partition wall 3 toward the side of the first surge tank compartment 4A remote from the partition wall 3 and second, fourth and sixth lower intake pipes $6A_2'$, $6A_4'$ and $6A_6'$ of the lower intake manifold 12' arranged in this order from the side of the second surge tank compartment 4B remote from the partition wall 3 toward the partition wall 3. The upper intake pipes $6A_2$, $6A_4$ and $6A_6$, one individual to the intake port of each cylinder in the first bank 2A, are connected at one end to the front side wall of the surge tank assembly 5, project toward the second bank 2B, and are bent downward so as to be connected at the other end to an upper flange 11; the lower intake pipes $6A_2'$, $6A_4'$ and $6A_6'$ are connected at one end to a lower flange 11' bolted to the upper flange 11, slightly bent back toward to the first bank 2A and at the other end to the intake ports in the first cylinder head 7A in the same order.

Similarly, the second surge tank compartment 4B of the surge tank assembly 5 is connected with intake ports in the second cylinder heads 7B by means of first, third and fifth upper intake pipes $6B_1$, $6B_3$ and $6B_5$ of the upper intake manifold 12 arranged in this order from the partition wall 3 toward the side of the second surge tank compartment 4B remote from the partition wall 3 and first, third and fifth lower intake pipes $6B_1'$, $6B_3'$ and $6B_5'$ of the lower intake manifold 12'. The lower intake pipes $6B_1$, $6B_3$ and $6B_5$, one individual to the intake port of each cylinder in the second bank 2B, are connected at one end to the front side wall of the surge tank assembly 5, project toward the second bank 2B, and are bent downward so as to be connected to the upper flange 11; the lower intake pipes $6B_1'$, $6B_3'$ and $6B_5'$ being connected at the other end to the lower flange 11' and at the other end to the intake ports in the second cylinder head 7B in the same order. That is, the intake ports in the first and second cylinder heads 7A and 7B are communicated with the surge tank assembly 5 by way of generally C-shaped intake passages $13A_2$, $13A_4$ and $13A_6$, and generally S-shaped intake passages $13B_1$, $13B_3$ and $13B_5$, which are independent of one another. Indicated by a characteristic reference 14 is a fuel injector disposed in each lower intake passage 6A' and 6B' for spraying fuel into each intake passage 13.

As is shown in detail in FIG. 2, the sixth upper intake pipe $6A_6$, which is connected to a trimmed corner wall 15A of the first surge tank compartment 4A of the surge tank assembly 5 at an angle of, for example, approximately 45° with respect to the longthwise direction of the surge tank assembly 5, projects outward from the surge tank assembly 5 at an approximately right angle to the trimmed corner wall 15A, and is bent back downward toward a space between the first and second cylinder banks 2A and 2B so as to extend and is connected to upper flange 11. On the other hand, the second upper intake pipe $6A_2$ is connected to a protruding wall 16A inclined at an approximately right angle to the trimmed corner wall 15A formed in one of inside corners of the surge tank compartment 4A of the surge tank assembly 5 adjacent to the partition wall 3, and projects at an approximately right angle to and from the protruding wall 16A, and extends downward toward the second surge tank compartment 4B of the surge tank assembly 5 to the upper flange 11. The fourth upper intake pipe $6A_4$ extends between and in parallel with the second and sixth upper intake pipes $6A_2$ and $6A_6$.

Similarly, the first upper intake pipe $6B_1$, which is connected to a trimmed corner wall 15B of the second surge tank compartment 4B of the surge tank assembly 5 at an angle of, for example, approximately 45° with respect to the lengthwise direction of the surge tank assembly 5 and at an approximately right angle to the trimmed corner wall 15A, projects outward from the surge tank assembly 5 at a substantially right angle to the trimmed corner wall 15B, is bent back downward toward the space between the first and second cylinder banks 2A and 2B so as to extend and is connected to the upper flange 11. The fifth upper intake pipe $6B_5$ is connected to a protruding wall 16B inclined at a substantially right angle to the trimmed corner wall 15B formed in one of inside corners of the second surge tank compartment 4B of the surge tank assembly 5 adjacent to the partition wall 3, projects at an approximately right angle to and from the protruding wall 16B, and extends passing through under the second and fourth upper in intake pipes $6A_2$ and $6A_4$ and downward toward the first surge tank compartment 4A of the surge tank assembly 5 to the upper flange 11. The third upper intake pipe $6B_3$ extends passing through under the second upper intake pipe $6A_2$ and between and substantially in parallel with the first and fifth upper intake pipes $6B_1$ and $6B_5$. According to the arrangement of the intake pipes, each of the outermost intake pipes $6A_6$ and $6B_1$ is made substantially equal in passage length to the other intake pipes and is gently curved.

The first and second surge tank compartments 4A and 4B of the surge tank assembly 5 are communicated with an air cleaner (which is not shown but may take any form well known in the art) by means of a common upstream intake pipe 17 mounted on an open end of the surge tank assembly 5. The upstream intake pipe 17 is divided into two independent, or first and second, upstream intake passages 17A and 17B by an extension of the partition wall 3 in the surge tank assembly 5 to be communicated with the first and second surge tank compartments 4A and 4B of the surge tank assembly 5, respectively. In the first and second upstream intake passages 17A and 17B, first and second throttle valves 18A and 18B are provided, respectively, and are synchronized with each other to open and close.

The partition wall 3 dividing the internal space of the surge tank assembly 5 into the first and second surge tank compartments 4A and 4B is formed with an aperture 20 in which provided is a regulating valve assembly 21. This regulating valve unit 21 comprises a valve body 21a and a regulating valve 21b in the form of a well known butterfly valve assembled as one unit and is inserted into a bottom opening 5a formed in the surge tank assembly 5 and bolted thereto. It is noted that the provision of the regulating valve unit 21 is preferable to decrease the overall height of the engine. The butterfly valve 21b is controlled to open and close in accordance with operating ranges of the engine 1, in particular to open in a high speed operating range and to close in a low speed operating range, so as to connect or disconnect the communication of air between the first and second surge tank compartments 4A and 4B. By opening and closing the regulating valve 21b, the conjunction of the intake pipes associated with the cylinders whose intake valves open simultaneously changes, resulting in a satisfactory intake inertia supercharging effect in a wide range of operating speed of the engine 1. The provision of the inclined protruding walls 16A and 16B formed adjacent to the partition wall 3 of the surge tank assembly 5 leads to decreasing the resistance of intake air flow while the regulating valve 21 is opened. The regulating valve 21 can be operated by any well known means 21 responsive to operating conditions of the engine.

Figure 3:
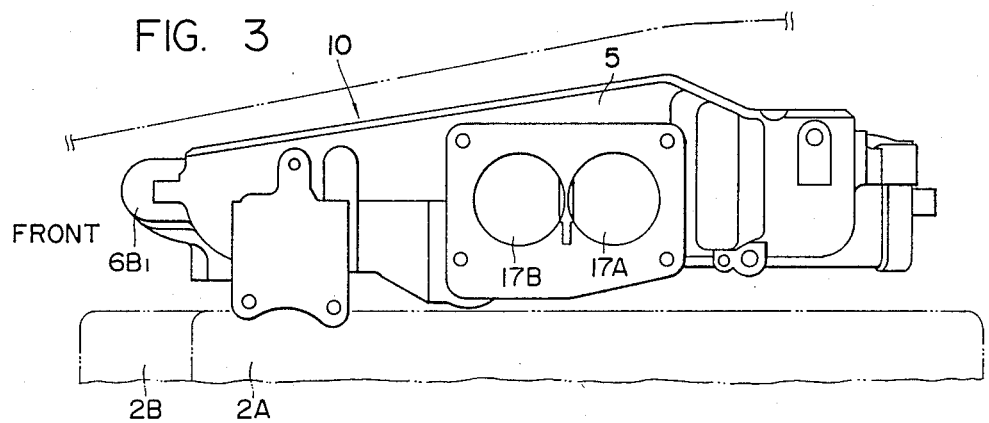
FIG. 3 is a side view of an intake system which cooperates with a V-type internal combustion engine installed lengthwise in an engine room of a car.

Referring to FIG. 3, there is shown the intake system 10 which is the same as that of FIG. 1 but mounted on a V-type six cylinder vehicle engine installed in the lengthwise direction from front to back of a vehicle. The surge tank compartments 4A and 4B into which the surge tank assembly 5 is divided by the partition wall 3 is arranged in the same direction as that in which the cylinders of the first and second banks of the vehicle engine installed in the lengthwise direction are arranged, namely as the direction in which the output shaft of the vehicle engine extends.

As is shown in FIG. 3, the first and second surge tanks 4A and 4B formed as one unit are so arranged front and back as to incline along an engine hood sloped forwardly down as is shown by a double dotted line. In particular in this preferred embodiment, the first surge tank 4A, that is the surge tank to which the generally C-shaped intake pipes are connected is disposed backside or rearwardly.

According to the intake system 10 thus constructed, because of the arrangement of the surge tank compartments 4A and 4B for the first and second banks 2A and 2B arranged in series in the direction of cylinder arrangement, namely in parallel with the output shaft of the vehicle engine 1, each of the surge tank compartments 4A and 4B can be made large in cross section and shaped substantially square without increasing the height there. This leads to a reduced intake air resistance and an improvement of reversed pressure effect while the overall height of the intake system 10 is reduced. Furthermore, because of the intake passages which are so gently curved as to be made substantially equal in length to one another without making the surge tank 5 longer or wider, a reduced intake air resistance in each passage can be realized and dynamic effects of intake air can be improved so as to increase generating power of the vehicle engine.

It will, of course, be understood that various changes may be made in the form, details, arrangement and proportion of the parts without departing from the scope of the present invention, as set forth in the accompanying claims.

What is claimed is:

1. A V-type internal combustion engine having first and second cylinder banks set at an angle to each other to define a V-shaped space therebetween, each of said cylinder banks including a plurality of cylinders arranged in a lengthwise direction in which an output shaft of the V-type engine extends, and an intake system, said intake system comprising:

generally rectangular box-shaped first and second surge tanks arranged end to end in said lengthwise direction;

a first set of intake pipes spaced in said lengthwise direction for communicating said first surge tank with said cylinders in said first cylinder bank, respectively, each of said first set of intake pipes extending from a side wall of said first surge tank adjacent said V-shaped space toward each of said cylinders in said first cylinder bank and being bent downward and toward said V-shaped space; and a second set of intake pipes spaced in said lengthwise direction for communicating said second surge tank with said cylinders in said second cylinder bank, respectively, each of said second set of intake pipes extending from a side wall of said second surge tank adjacent said V-shaped space toward each of said cylinders in said second cylinder bank and being bent downward and toward said V-shaped recess.

2. An engine having an intake system as defined in claim 1, wherein said first and second surge tanks are disposed over one of said first and second cylinder banks, each intake pipe of one of said first and second sets of intake pipes communicating said one of said first and second surge tanks with each cylinder in said one of said first and second cylinder banks is substantially C-shaped and at least one of said intake pipes of the other of said first and second sets of intake pipes extends into said V-shaped space passing through a space formed by said C-shaped intake pipes.

3. An engine having an intake system as defined in claim 2, wherein said V-type internal combustion engine is disposed in a crosswise direction substantially perpendicular to said lengthwise direction.

4. An engine having an intake system as defined in claim 2, wheren said V-type internal combustion engine is disposed in said lengthwise direction and said first and second surge tanks are so arranged front and back as to incline along an engine hood which is sloped forwardly down.

5. An engine having an intake system as defined in claim 4, wherein said surge tank to which said generally Cshaped intake pipes are connected is disposed rearwardly in said lengthwise direction relation to said generally C-shaped intake pipes.

6. An engine having an intake system as defined in claim 1, wherein intake pipes of said first and second sets of intake pipes which are outermost with respect to the other intake pipes partially extend away from said first and second surge tanks and are bent back into said V-shaped space, respectively.

7. An engine having an intake system as defined in claim 6, wherein said first and second surge tanks are disposed over one of said first and second cylinder banks, each intake pipe of one of said first and second sets of intake pipes communicating said one of said first and second surge tanks with each cylinder in said one of said first and second cylinder banks is substantially C-shaped and each intake pipe of the other of said first and second sets of intake pipes extends into said V-shaped space passing through a space formed by said C-shaped intake pipe.

8. An engine having an intake system as defined in claim 6, wherein said first and second surge tanks are disposed over one of said first and second cylinder banks, each of said first and second surge tanks being formed with a trimmed corner wall from which one of said outermost intake pipes extends outside each surge tank at an angle.

9. An engine having an intake system as defined in claim 8, wherein each one of said outermost intake pipes is at approximately a right angle to the trimmed corner wall.

10. An engine having an intake system as defined in claim 6, wherein said first and second surge tanks are disposed over one of said first and second cylinder banks, each of said first and second surge tanks being formed with an inclined wall from which one of the intake pipes of each of said first and second sets of intake pipes which are innermost with respect to the other intake pipes extends toward the other surge tank at an angle.

11. An engine having an intake system as defined in claim 10, wherein each innermost pipe is at approximately a right angle to the inclined wall.

12. An engine having an intake system as defined in claim 1, wherein said V- type internal combustion engine six cylinders, three in each of said first and second cylinder banks, which fire alternatively between said first and second banks, and said first and second surge tanks are formed by dividing a generally rectangular box-shaped tank into two surge tank compartments with a partition wall formed with an opening communicating said two surge tank compartments with each other, the size of said opening being changed by a regulating valve disposed therein controlled by means responsive to operating conditions of said engine.

13. An engine having an intake system as defined in claim 12, wherein said generally rectangular box-shaped surge tank is formed with a bottom opening below said partition wall into which said regulating valve unit, comprising a butterfly valve and a valve body for supporting said butterfly valve, is fitted.

14. An engine having an intake system as defined in claim 1, wherein each of said first and second sets of intake pipes comprises an upper intake pipe secured to said surge tank at one end and integrally formed with a flange at the other end and a lower intake pipe integrally formed with a flange at its one end and connected with each of said cylinder at the opposite end, said upper and lower intake pipes being connected with each other through said flanges.

15. An engine having an intake system as defined in claim 14, wherein said generally rectangular box-shaped surge tank has a substantially square cross section.

* * * * *